United States Patent [19]
Tachita et al.

[11] 4,330,875
[45] May 18, 1982

[54] FOCUSING CIRCUIT FOR ULTRASOUND IMAGING SYSTEM

[75] Inventors: Ryobun Tachita; Hiroshi Fukukita, both of Kawasaki, Japan

[73] Assignee: Matsushita Electric Industrial Company, Limited, Osaka, Japan

[21] Appl. No.: 103,478

[22] Filed: Dec. 14, 1979

[30] Foreign Application Priority Data

Dec. 19, 1978 [JP] Japan .................. 53-157317

[51] Int. Cl.³ .............................. G01S 9/66
[52] U.S. Cl. ..................... 367/105; 73/626; 128/660
[58] Field of Search .................. 128/660–663; 73/620, 625–626; 343/100 SA; 367/103, 105, 135, 903

[56] References Cited

U.S. PATENT DOCUMENTS

| | | | |
|---|---|---|---|
| 4,005,382 | 1/1977 | Beaver | 73/626 X |
| 4,058,003 | 11/1977 | Mocovshi | 128/660 X |
| 4,080,838 | 3/1978 | Karoda et al. | 73/626 X |
| 4,116,229 | 9/1978 | Pering | 128/660 |
| 4,140,022 | 2/1979 | Moslak | 73/626 |
| 4,159,462 | 6/1979 | Rocho et al. | 128/661 X |
| 4,180,792 | 12/1979 | Lederman et al. | 128/660 X |
| 4,208,916 | 6/1980 | Thomenius et al. | 128/660 X |
| 4,223,560 | 9/1980 | Glenn | 73/626 |

Primary Examiner—Robert W. Michell
Assistant Examiner—Francis J. Jaworski
Attorney, Agent, or Firm—Lowe, King, Price & Becker

[57] ABSTRACT

A focusing circuit for focusing an array of transducers of an ultrasound imaging system includes a variable delay line comprising a plurality of summing amplifiers and a plurality of variable delay elements provided between successive summing amplifiers. A plurality of switches is provided for respectively connecting the transducers to selected summing amplifiers. The amount of delay of each variable delay element is individually controlled so that the corresponding electrical signals derived from the transducers arrive in phase at the output end of the variable delay line.

4 Claims, 1 Drawing Figure

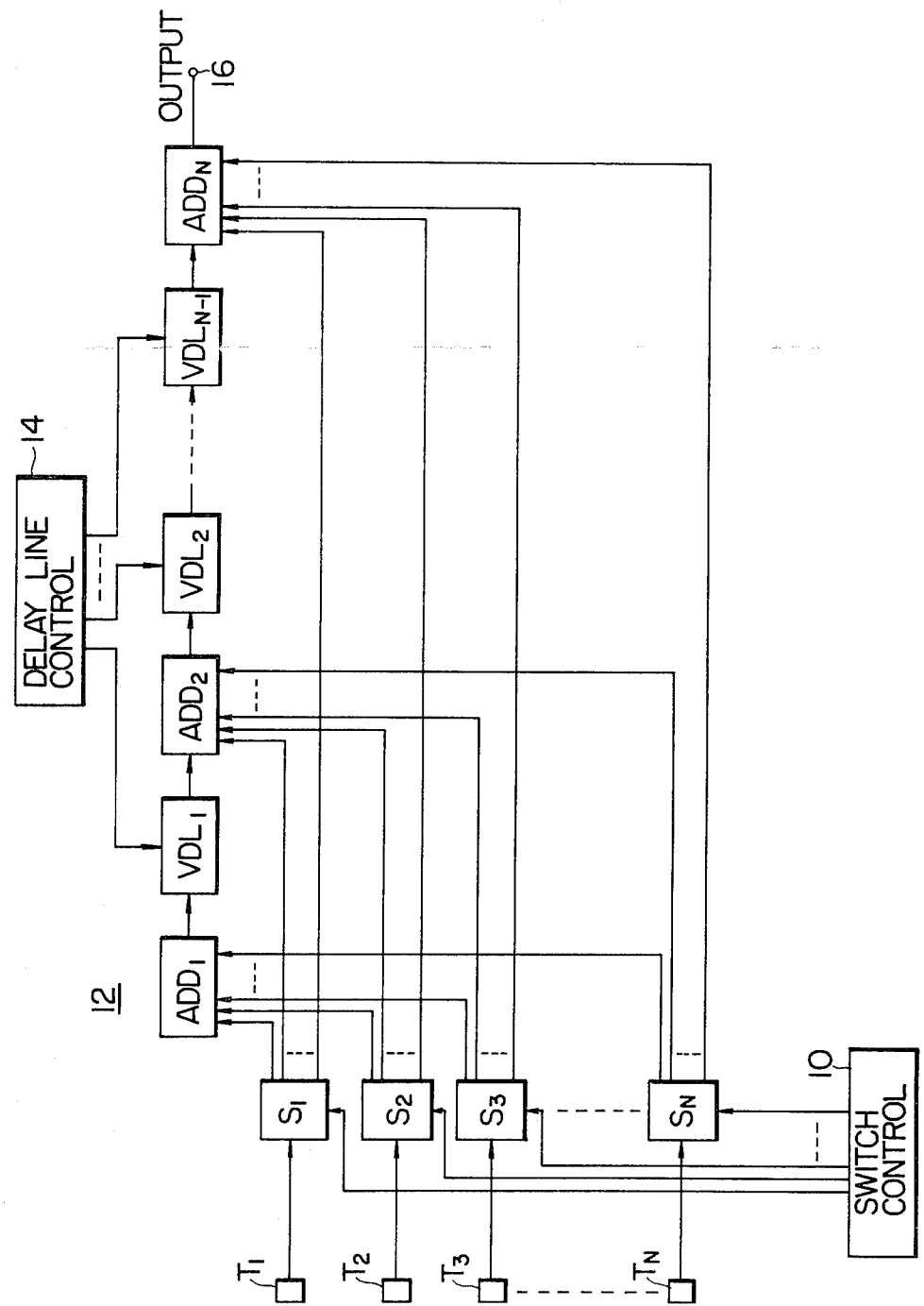

FOCUSING CIRCUIT FOR ULTRASOUND IMAGING SYSTEM

BACKGROUND OF THE INVENTION

The present invention relates generally to ultrasound imaging systems, and particularly to a receiving unit of the imaging system to receive reflections of the ultrasound waves from internal portions of a body having different acoustic properties. The invention is more concerned with the focusing of the transducer array to a summing point by compensating for the diffferent times of arrival of the reflections of the ultrasound waves at the transducers.

In an ultrasound imaging system, an array of piezoelectric transducers is placed in contact with the human body and electrically energized by short pulses of ultrasonic frequency for transmitting acoustic waves into the body. The relative times of the transmission of ultrasound pulses are so selected that acoustic waves for each pulse are formed into a beam which extends in any desired direction and successively varied so that the beam is deflected to scan a sector. As the acoustic waves propagate through the body tissue, a portion of the acoustic energy is reflected as they encounter tissue of a different acoustic characteristic. Because the distances between any point of reflection and the various receiving transducers are usually different, the reflections arrive at the transducers at different times. It is therefore necessary to introduce compensating delays between each transducer and a summing point where the corresponding electrical signals derived from the transducers are combined, so that the total time between reflection of an acoustic wave from the point of reflection and the arrival of the corresponding electrical signals at the summing point is the same regardless of which transducer is involved.

U.S. Pat. No. 4,116,229 granted to R. D. Pering discloses the use of a master delay line which is tapped so that a signal injected into each tap experiences a different delay and a plurality of incremental delay elements having small amount of variable delays. Each incremental variable delay is connected between one or more of the transducers and a selected tap on the master delay line. The taps on the master delay line are connected to the transducers through the small variable incremental delays via a switching network so that the array is focused along a desired scan angle or direction and the small variable delays are changed during a scanning of that direction so as to shift the focus of the array from minimum to maximum range. The delays provided between successive taps on the master delay line are of fixed value and constitute the minimum delay corresponding to the minimum focus range. However, because of the fixed amount of master delay line, difficulty is encountered in precisely determining the amount of delay between any two successive transducers. In addition, since the incremental delay line must be provided for each transducer, the total amount of delay that is required will still be substantial when a great number of receiving transducers are employed.

SUMMARY OF THE INVENTION

The present invention contemplates the use of a single delay line having a plurality of summing amplifiers and a plurality of variable delay elements between successive summing amplifiers. Switched connections are provided for respectively connecting the transducers to selected summing amplifiers in response to switch control signals. The amount of delay for each variable delay element can be precisely varied in response to a variable delay control signal so that the signals derived from the transducers arrive in phase at the output end of the delay line. The maximum amount of delay that is required for each variable delay element corresponds to the maximum amount of delay that is provided between two successive transducers, so that the total amount of delay can be reduced.

BRIEF DESCRIPTION OF THE DRAWING

The invention will be further described with reference to the sole drawing which schematically illustrates the receiving transducers with associated interconnecting switches connecting the transducers to selected summing amplifiers of a variable delay line.

DETAILED DESCRIPTION

In the drawing, a plurality of transducers $T_1$, $T_2$ ... $T_N$ are respectively connected to delay line controlling switches $S_1$, $S_2$ ... $S_N$ for respectively connecting the transducers to a variable delay line 10. The switches $S_1$ to $S_N$ are each provided with output terminals which are connected to summing amplifiers or adders $ADD_1$ to $ADD_N$ so that the output terminals of switch $S_1$ are connected respectively to first inputs of the adders $ADD_1$ to $ADD_N$, and the output terminals of switch $S_2$ are connected respectively to second inputs of the adders $ADD_1$ to $ADD_N$, the output terminals of the switch $S_N$ being respectively connected to the Nth inputs of the adders $ADD_1$ to $ADD_N$. The variable delay line 10 is comprised of a plurality of variable delay elements $VDL_1$ to $VDL_N$ which are connected between successive adders ADD so that the delay elements $VDL_1$ is connected between the output of the adder $ADD_1$ and an input of the adder $ADD_2$, and so on. The controlling switches $S_1$ to $S_N$ are each provided with control inputs connected to respective terminals of a switch control unit 12, the latter being a read only memory which is addressed in response to a clock pulse. Each controlling switch may comprise an analog multiplexer which receives a respective binary address data from the read only memory to establish a switched connection between the associated transducer T and the input of a selected adder ADD so that each transducer is connected to any one of the adders during a scanning of a given direction.

Each variable delay element VDL comprises a digital variable delay circuit which imparts a predetermined amount of delay to the input signal depending on a binary data supplied from a delay line control unit 14. The latter may also be comprised of a read only memory which is addressed in response to the same clock pulse supplied to the switch control unit 12 to generate the variable delay data for application to a respective one of the variable delay circuits. Therefore, during a scanning of that given direction the amounts of delay are determined with respect to that direction and the transducers are respectively connected to the selected adders.

With the arrangement described above, the transducers T serve as receiving transducers for converting the reflected acoustic waves into corresponding electrical signals and applying the latter to the associated controlling switches S. The array of transducers T can be focused at a desired point along a given direction by appropriately establishing connections between the transducers and the adders and by appropriately determining the respective delays in the delay line 10. Thus, for a particular direction, the variable delay line 10 provides the predetermined amount of delay for each transducer.

An advantage of the invention is that the incremental amounts of delay between successive transducers can be precisely controlled with a relatively small total amount of delay. This stems from the fact that each of the delay elements VDL permits a substantial range of delays under the control of the delay line control 14.

The switching network formed by the switches $S_1$ to $S_N$ permits any one of the transducers to be connected to any one of the summing amplifiers so that in some instances different transducers can be connected to the same summing amplifier and thus allows the transducers to be given desired amounts of delay. It can be seen, therefore, that the difference in times of arrival of reflections of the ultrasound waves from any focal point can be compensated for by the system of the invention so that the electrical signals corresponding to these reflections will arrive in phase at the output terminal 16 of the adder $ADD_N$ to produce a sharply defined image on a viewing screen.

What is claimed is:

1. A variable delay type ultrasound imaging system having minimum total delay, comprising an array of transducers, a delay line means consisting of a single variable delay line having, in series, a plurality of summing junctions and variable delay elements between successive summing junctions, means for connecting any one of said transducers selectively to any one of said summing junctions and means for respectively controlling the amount of delay of said variable delay elements to provide focusing of said transducer array.

2. An ultrasound imaging system as claimed in claim 1, wherein said connecting means comprises a plurality of switches, each one of said switches having an input terminal connected to a respective one of said transducers and a plurality of output terminals connected respectively to said summing junctions so that each of said transducers can be connected to any one of said summing junctions.

3. A variable delay circuit for focusing an array of transducers at a point along a given direction with respect to the array, said circuit having minimum total delay and comprising:

a delay line means consisting of a single variable delay line having, in series, a plurality of successive summing junctions and a plurality of variable delay elements provided between successive summing junctions;

means for connecting any one of said transducers selectively to any one of said summing junctions; and means for respectively controlling the amounts of delay of said variable delay elements to provide focusing of said transducer array.

4. A circuit as claimed in claim 3, wherein said connecting means comprises a plurality of multi-position switches, each one of said switches having an input terminal connected to a respective one of said transducers and a plurality of output terminals connected respectively to said summing junctions so that each of said transducers can be connected to any one of said summing junctions.

* * * * *